United States Patent
Fidrych

[15] 3,638,987
[45] Feb. 1, 1972

[54] OPEN-MESH WOVEN WIRE TUBE

[72] Inventor: Alfred W. Fidrych, Stonington, Conn.

[73] Assignee: Harvey Hubbell, Incorporated, Bridgeport, Conn.

[22] Filed: May 1, 1970

[21] Appl. No.: 33,822

[52] U.S. Cl. .................................... 294/86 CG, 24/123 F
[51] Int. Cl. ............................................ F16g 11/03
[58] Field of Search .................... 294/74, 86; 24/123 F; 124/30 A; 272/8 N, 27 N

[56] References Cited

UNITED STATES PATENTS

| | | | |
|---|---|---|---|
| 2,688,172 | 9/1954 | Kellems | 24/123 F |
| 2,602,207 | 7/1952 | Kellems | 24/123 F |
| 869,686 | 10/1907 | Bauno | 272/8 N X |

*Primary Examiner*—Evon C. Blunk
*Assistant Examiner*—Johnny D. Cherry
*Attorney*—Sylvester J. Liddy, John J. Hart, Joe E. Daniels and Charles E. Baxley

[57] ABSTRACT

An open-mesh wire grip having the wire strands so woven that at an intermediate place adjacent to that end thereof opposite to the draft end of the grip there is provided a section of predetermined high-angle weave located between and joined to sections of larger mesh. Preferably in that section of the grip forming such opposite end thereof the weave is such that the strands form a gradually increasing mesh size from said section of high-angle weave.

9 Claims, 8 Drawing Figures

PATENTED FEB 1 1972

INVENTOR.
ALFRED W. FIDRYCH
BY
John J. Hart
ATTORNEY

INVENTOR.
ALFRED W. FIDRYCH
BY
ATTORNEYS

OPEN-MESH WOVEN WIRE TUBE

THE INVENTION

This invention relates to open-mesh woven wire grips of the type used for drawing, holding and supporting cables, flexible conduits, and other objects.

Gripping devices of the indicated type have a tubular body portion provided at one end with a draft device to enable the grip to support or draw an object and having its other end open to enable the object to be inserted therein. The body portions of these grips whether made as a complete tube, or as a split tube, are usually composed of wire strands woven so that in their tubular form they will have a normal internal diameter smaller than the external diameters of the range of cables or other types of objects for which they have been designed. It is well known that the internal diameters of these gripping devices may be considerably varied by endwise compression and extension thereof. Thus, they may be expanded radially by endwise compression to enable them to readily receive the object, and when the compression force is removed, such devices contract radially to frictionally engage the periphery of the object. Any subsequently applied forces tending to separate these devices from the objects gripped thereby cause them to effect a firmer grip on the objects until a point is reached at which the applied force is greater than the frictional grip that any of such devices is capable of exercising on an object.

It is known that the angle of weave of the wires in the grip has a direct bearing on the gripping ability of these devices and that a relatively high angle of weave is necessary if such a device is to have a high degree of gripping ability without slippage. This knowledge is made use of in making the so-called "variable weave" grip, wherein the strands at the object receiving end of the grip are woven at a greater angle than in the remainder of the grip in order that the grip will immediately establish a tight grip on an object at such end and thereby assure that the device will effectively grip the object throughout its entire length. There are limitations however, in existing types of grip constructions to the maximum size of the weave angles which can be utilized in making such constructions. Thus, in the so-called "endless weave" type of grip which is made of strands of wire that are bent or folded substantially midway of their ends to form loops at the object receiving end of the grip, it has been found that such loops at the object receiving end of the grip limit the degree of radial expansion that the grip may make. This is also true of the types of grips in which pairs of wires are connected together at the object receiving ends thereof by twisting the ends of such paired wires together, or by connecting such paired ends together by metal end tabs. The limitations to such expansion are quite definite, or fixed, because of the relatively nonstretchable qualities of the wires that are employed in making such grips. Also in those grips in which the paired wire ends are connected together by twisting or by end tabs, the condition can be aggravated by twisting more than necessary, or by pushing the tabs too close to the body of the grip. Further, the degree of such expansion at the object receiving ends of such prior grips becomes more restricted, the higher the weave angles that are employed in the end portions of such grips. It has been found that when there is utilized in the end portions of open mesh grips a weave angle such that the strands will assume a maximum working angle of from 120°-130° in the fully radially expanded condition of the grips for ready assembly on objects, that that is the maximum weave angle which can be employed in known types of grips, as presently constructed. When weave angles greater than such maximum were attempted in conventionally woven grips their radial expansion became so limited that the range of diameter sizes of objects that could be inserted into such grips was practically infinitesimal.

The employment of high weave angles in conventionally woven grips was also found to produce at the object receiving ends of such grips a so-called "choking effect" which made it difficult to apply a grip over a cable end of even the exact size for which it may have been constructed. This chocking effect which is due to a reduction of the diametrical opening at the grip end, is produced when the mesh is longitudinally collapsed under the force used for insertion of the cable end and takes place in the area of the first, second and third mesh spaces from the end. It has been found that this disadvantage exists in both the constant weave and variable weave grips of conventional design. It is however, a much more serious problem in the latter type of grip, due to the fact that in the variable weave grips the weave angles usually decrease from the object receiving end of the grip thereby rending them progressively less resistant to axial compressive forces at progressively greater distances from such end of the grip. As a consequence, such grips will collapse under the application of such forces.

While in the use of split grips, such grips are usually mounted on the object and then secured in tubular form thereon, rather than first forming them into tubular form and then inserting the object into one end thereof, the provision of high weave angles in conventionally woven grips of this type created a different problem. A grip of this type is woven to provide two series of loops along the sides thereof and these two series of loops are connected together by a wire lace, or by a rod, or by latching devices, etc., in securing the grip on an object. It is customary in fastening the two looped sides or edges of the grip to progressively proceed from the draft end of the grip toward the other end thereof. As this operation proceeds the loops and meshes at the other end portion of the grip become distorted and diminished in size and the end loops become difficult to thread. This is due to the fact that the weave is limited in the amount it can be stretched around on object because of the circumferential limits of stretch of the braided mesh at high weave angles and if the weave at such other end of the grip is disturbed by the fastening operation the grip can only be closed with difficulty. In fact, such distortion of the grip structure as a result of the fastening operation often renders it impossible to pull the sides of split mesh into proper closed position so that the resulting grip is not as effective as it should be.

The problems resulting from the aforesaid disadvantages of the known types of grip constructions have caused dissatisfaction with them for some time, but the art, prior to the instant invention, has not been able to provide a completely satisfactory solution for them. Efforts have been made to overcome certain of such disadvantages, such as by mechanically preforming the woven grip to enlarge the object receiving end so that a cable can more readily be inserted therein. Such preforming operations however, lessen the holding powers of the grips and make it practically impossible for them to function properly on smaller diameter cables. These problems have become more pressing in recent years because of the present tendency to provide cables and other objects with exterior surfaces that are so smooth, hard and slick that the gripping ability of presently constructed grips thereon have been substantially reduced.

The principal object of the invention to provide an improved open-mesh wire grip having greater holding power than existing grips of this type without the disadvantages of the latter.

Another object of the present invention is to provide an improved open-mesh woven tubular wire grip that can easily be installed on an object to provide satisfactory service thereon even though the gripped surface portions of the object are quite smooth, hard and slick.

A further object of the invention is to provide an improved wire grip which, while the opening formed by the wire construction at the object receiving end thereof has a restricted expansion less than the expansion of the grip body, is capable of readily receiving and of providing adequate gripping power on objects having a wide range of exterior diameters.

A still further object of the invention is to provide an improved open-mesh split grip of high holding power that can be readily and properly closed on an object.

Other objects of the invention, as well as the advantages and features of novelty thereof, will appear from a perusal of the following description, when read in connection with the accompanying drawings, in which FIG. 1 is an elevational view of a portion of a standard variable weave type of grip in relaxed condition;

Figure 1:
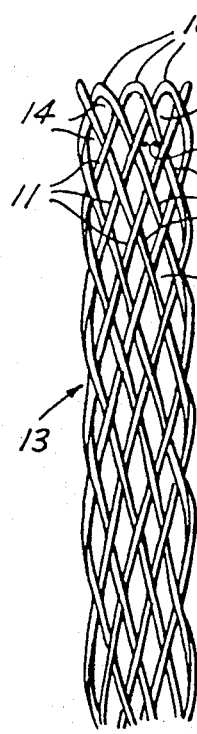
Figure 2:
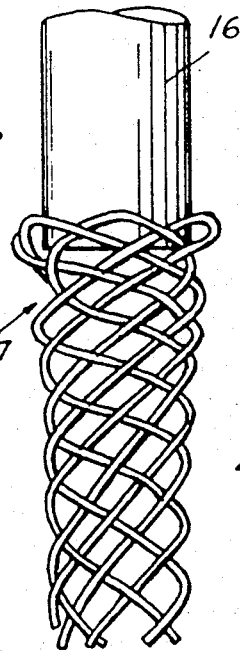
FIG. 2 is a view similar to FIG. 1 showing the condition of the grip when the object receiving end is collapsed under the pressure exerted to insert the end of the cable therein.

In the known kind of standard variable endless weave type of grip shown in FIGS. 1 and 2 of the drawings, the grip is composed of a plurality of strands bent or folded substantially midway of their ends to form at the object receiving end of the grip a plurality of loops 10. The two strand sides or ends 11, 12 of each strand extend downwardly from the loop 10 formed thereby and are wound spirally in opposite directions and interwoven with the other strand ends in the manner of braiding or weaving to form an open-mesh tube 13. The crossing portions of the strand ends are free to move relatively to each other so that the open-mesh tube may be expanded radially by endwise compression thereof, or reversely, contracted radially by endwise extension. At the opposite or draft end of the grip the strands are gathered together in groups to form draft means enabling the grip to support an object or to draw it endwise, as in the case of a cable through a conduit. The draft means may be of any suitable known construction and may be in the form of a loop, or loops, such as the draft loops shown on the split grip illustrated in FIGS. 7 and 8 of the drawings.

Figure 5:
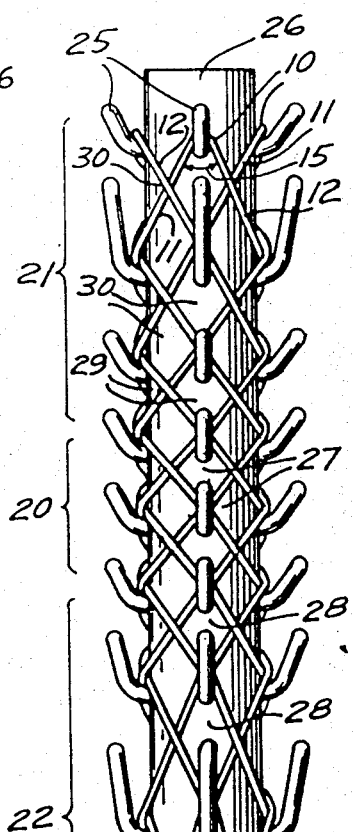
FIG. 5 is an enlarged elevational view of a portion of the variable weave grip of FIGS. 3 and 4 mounted on a mandrel for constructing the same.
Figure 6:
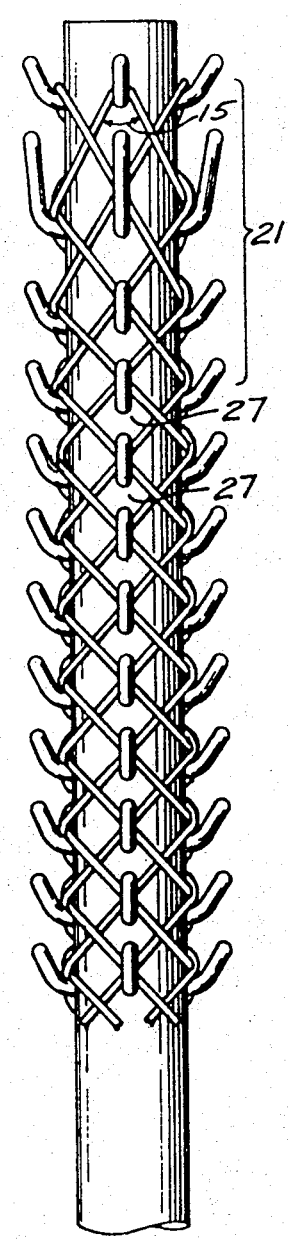
FIG. 6 is a view similar to FIG. 5 showing a constant weave type of grip embodying the invention.

In the conventional variable weave type of grip shown in FIGS. 1 and 2, the meshes 14 are made relatively short axially at the object receiving end of the grip and gradually increase in axial length form the top downwardly without altering the circumferential width of the mesh. In the conventional constant weave type of grip on the other hand, the size of the mesh is constant throughout the length of the grip. In both types of grips, however, the strand ends 11 and 12 are woven so that in at least the object receiving end thereof the weave angle designated by the double-headed arrows 15 in FIGS. 1, 5 and 6, is made high enough in order to assure that the grip will have the proper holding power (gripping ability). As previously indicated, the maximum weave angles capable of being utilized in existing constant weave and variable weave grips are such that the working angles thereof are in the 120°–130° range when the grips are radially expanded to their maximum interior diameters. This limitation, as has also been previously indicated, is due to the construction of such grips at the object receiving ends thereof, whether they be of the endless or loop form as illustrated, or the strands thereof at such ends are secured together by twisting, or by tabs. Further, because of such construction at the object receiving end of the conventional grip, when the grip is radially expanded as by attempting to insert it over the end of a cable 16 as is shown in FIG. 2 of the drawings, a choke, designated 17 in such figure, is induced at such endless weave end. Such a choking action restricts the inside diameter of the grip at its object receiving end, makes it difficult to apply the grip over the cable, and if sufficient force is used in order to accomplish such application, tends to cause the grip end to collapse. This tendency, as has been pointed out, is aggravated when the grip is of the variable weave type shown in FIGS. 1 and 2.

Figure 3:
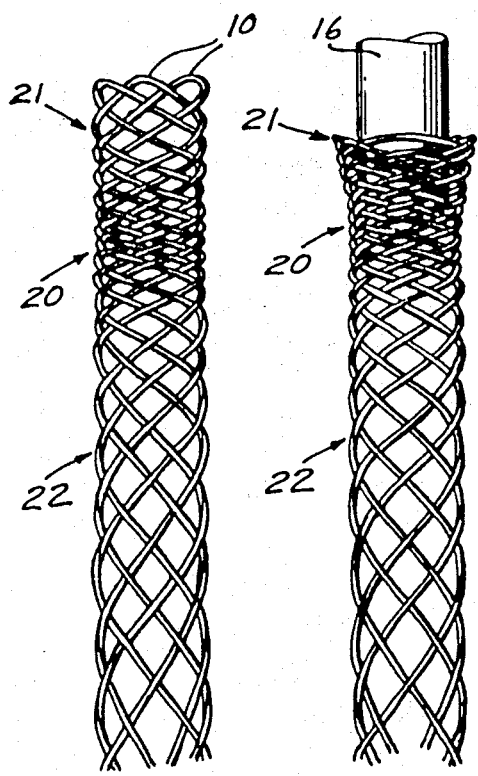
FIG. 3 is an elevational view of a portion of a variable weave type of grip embodying the invention, the grip being shown expanded radially from its normal relaxed condition in order to illustrate more clearly the weave pattern thereof.
Figure 4:
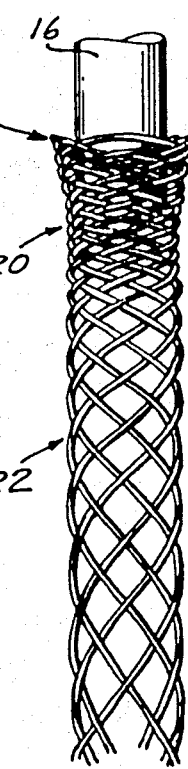
FIG. 4 is a view similar to FIG. 2 showing the condition of the grip of FIG. 3 when the object receiving end is collapsed under endwise pressure.

In a grip embodying the invention as shown in FIGS. 3 and 4 of the invention, the maximum weave angles are provided in the grip at a place generally designated 20 spaced from the loops 10 at the object receiving end of the grip. From such place 20 to the loops 10, generally designated 21 in FIG. 3, the strands are woven so that when the grip is radially expanded, as by the insertion of the end of a cable 16 as shown in FIG. 4, the grip in the area designated 21 will assume a funnellike shape. As a result of this construction, therefore, the choke at the endless weave end (the object receiving end) will be eliminated and the insertion of the grip over the object will be facilitated. Further, as will hereinafter be pointed out, it is possible as a result of such construction to utilize in the high weave section 20, higher weave angles than is now possible in present constructions, and of such order that the maximum working angle of the grip will be in the neighborhood of from 130°–160°. The strands in the remaining section 22 of the grip may be woven to provide either a variable weave, as shown, or a constant weave, as will hereinafter become more clear.

The construction of the variable weave grip embodying the invention depicted in FIGS. 3 and 4, will be more clearly understood, it is believed, from a consideration of FIG. 5 of the drawings. In such figure, the three aforesaid areas or sections 20, 21 and 22 of such grip are more precisely indicated by braces. The grip illustrated by way of example is of the endless type and is made in the manner previously indicated by bending or folding each strand at its midpoint over one of the topmost lugs 25 of a suitable mandrel 26 to form the loops 10 at the object receiving end of the grip. The two sides or ends 11, 12 of each strand are then wound spirally in opposite directions around and upon the periphery of the mandrel 26 and interwoven with the sides or ends of the other strands to form an open-meshed tube. At the other extremity of the woven grip body the strands are gathered to form draft means, such as the draft loops illustrated in the split grip shown in FIGS. 7 and 8 of the drawings. In the formation of the section 21 of the body of the tube or grip, the strands are woven to produce mesh which progressively increases in an axial or longitudinal direction from the bottom end of such section upwardly as viewed in FIG. 5. In the formation of the section 20 of such tube the strands are woven to produce the desired maximum weave angles which results in mesh 27 of relatively short length axially. The strands are then woven so that in the section 22 of the tube the mesh 28 formed in such section gradually increase in axial length from the top end of such section 22 downwardly toward the other or draft end of the tube.

The weave angles forming the mesh 27 in the tube section 20 are the maximum that can be used in order that the grip may be enabled to properly grip products having smooth, hard, slick gripping surfaces. It has been found that this result is attained when the weave angles are such that the strands will assume working angles of from 130°–160° in the fully radially expanded condition of the grip at which it can be readily assembled on an object. It is possible to attain this end in the grip of FIGS. 3–5 because the strand portions forming the tube section 20 are located inwardly of the ends of the tube and the crossing portions of the strands in the adjoining ends of the tube sections 21, 22 are free to move relatively to each other. In other words, due to the fact that the tube section 20 is located in spaced relation from the loops 10 at the object receiving end of the grip and is separated therefrom by strand portions which at their crossings are relatively movable, it is possible to increase the diameter range capabilities of a grip to provide in such section 20 a higher working or surface gripping weave angle than is now capable of being properly utilized in presently constructed grips. The strand portions in the tube section 21 are preferably woven in a variable weave design and so that the axial lengths of the mesh 29 therein adjacent to the upper end of the section 20 of high weave angle are only slightly greater than the axial lengths of the mesh 27 in such section 20. The axial lengths of the mesh 30 upwardly from the mesh 29 are made progressively longer so that the uppermost mesh 30 formed in part by the loops 10 may have an axial length approximating twice that of the mesh 27 in section 20. As a result of this construction, the outer tube section 21 will, when compressed, assume the funnellike shape illustrated in FIG. 4, thereby enabling the easy assembly of the grip over objects that will expand the mesh radially to working weave angles that are conducive to firm gripping of surfaces that cannot be effectively gripped by known types of holding devices. Tests have shown that known types of variable weave grips for a 1.06 diameter cable will slip at pulls of from 200 to 250 lbs., whereas a comparable grip made according to the invention will withstand pulling force up to 670 lbs. This is an increase of approximately 250 percent holding power at this tested diameter of the grip. Tests also confirm easier assembly of the grip of this invention on cables of maximum diameter (1.250) in the range for which these grips were made. Tests have shown that by constructing a grip in accordance with the invention, it is possible to increase the grip diameter range by as much as 25 percent. It was further found that not only was it possible by the weave of this invention to materially increase the diameter range and holding power of a grip, but such results were capable of being accomplished by grips of shorter length than comparable grips of conventional design. Thus, it was found by test that it was possible by constructing a grip in accordance with the invention to increase the holding power of the grip by 250 percent, while reducing its mesh length by 15 percent.

The grip shown in FIG. 6 of the drawings, has an object receiving end section 21 similar in construction to the section 21 in the grip of FIG. 5. As in the grip of FIG. 5, the meshes 27 in the portion of the grip adjoining the bottom end of the section 21 thereof are formed by a given high-angle weave which renders the grip capable of properly gripping objects having hard, slippery surfaces. The grip of FIG. 6, however, differs from that of FIG. 116 5, in that when such given high-angle weave is attained, it is maintained constant throughout the remainder of the grip toward its opposite end. This grip therefore, while it possesses the aforesaid advantages resulting from the invention, will have a neutral diameter than that of the variable weave-type grip shown in FIG. 5 for a given range of cable diameters.

Figure 7:
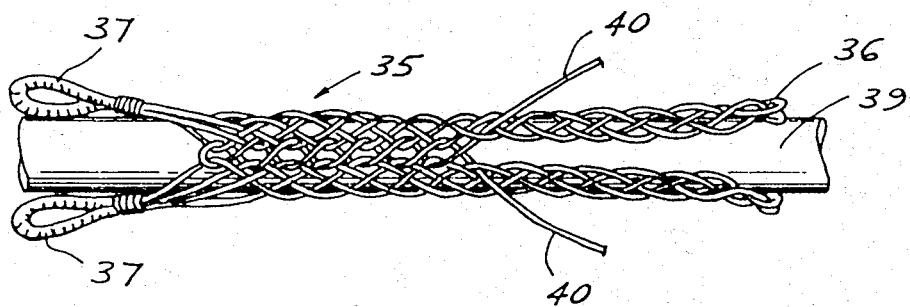
FIG. 7 is a plan view of a split grip showing the manner in which it is customarily mounted in position on a cable.
Figure 8:
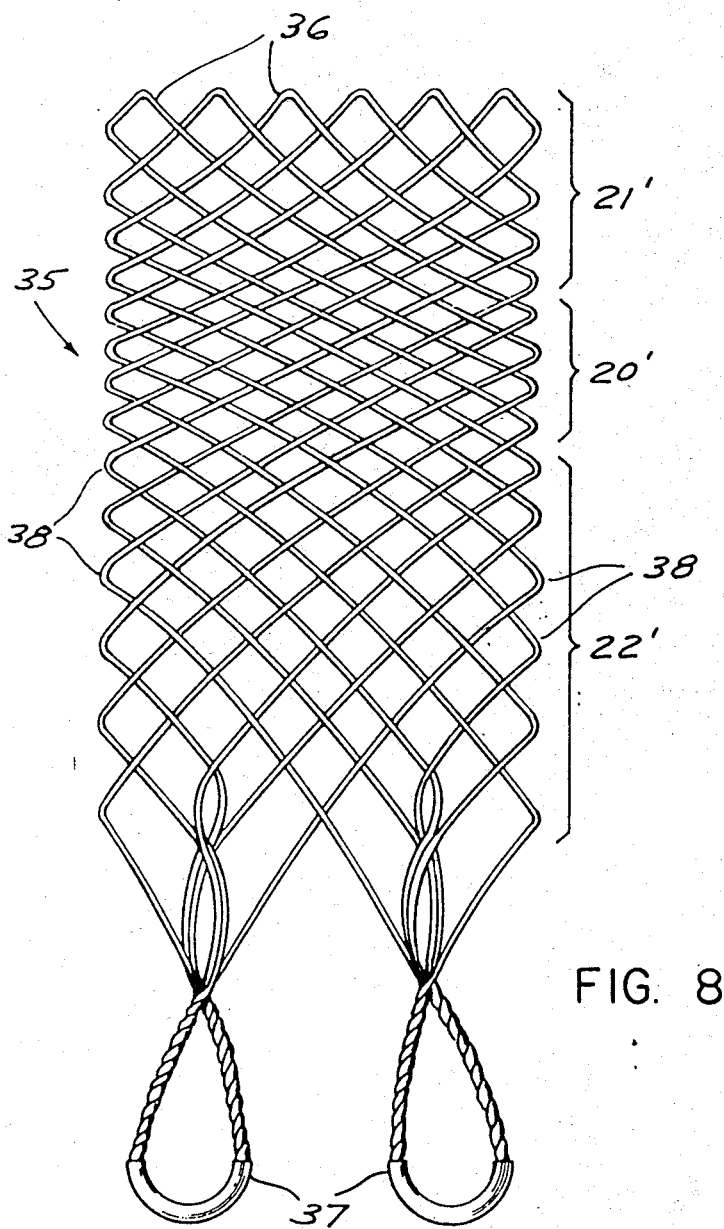
FIG. 8 is a view of a split grip embodying the invention in extended position.

In FIGS. 7 and 8 of the drawings there is shown a tubular open weave grip of the split type. As in the case of the grips of FIGS. 5 and 6, the body 35 of the grip which assumes a cylindrical form when applied to a cable as shown in FIG. 7, is composed of a plurality of interlaced strands. The strands are inclined with respect to the axis of the body so that they pass in helices thereabout. At the extremity of the body comparable to the object receiving ends of the grips of FIGS. 5 and 6, the strands may be continuous so that they form loops 36, as shown, or may be attached together in pairs by twisting, or by tabs, as is known in the art. At the opposite extremity or draft end of the grip, the strands are grouped together and united so as to form draft loops 37 which are adapted to receive suitable coupling devices so that a pulling force may be readily applied to the object, or it may be suitably supported. As is shown more clearly in FIG. 8 of the drawings, the body 35 of the grip is split, the strands thereof being woven so that a series of loops 38 are formed along each longitudinal edge or side thereof. When the grip body is wrapped around on object, such as the cable 39 shown in FIG. 7, the longitudinal edges thereof are firmly secured together by any suitable fastening means such as the flexible lacing wire or strand 40 shown in such figure.

Within the body area of the grip, the strands are woven to provide woven sections comparable to the previously described woven sections 20, 21 and 22 of the grips shown in FIGS. 3 to 6 of the drawings. Thus, in the section 20', the strand portions are woven to provide in such section a high working weave angle enabling the grip to grasp the object firmly and strongly. Outwardly from section 20' towards the loops 36, in the section designated 21', the strand portions are woven so that the axial lengths of the mesh formed thereby become progressively longer than the mesh formed in the body section 20'. In the section 22' of the grip body, the strand portions may also be woven so that the axial lengths of the mesh formed thereby progressively increase in length from the section 20' towards the draft end of the grip body in the manner of the previously described section 22 of the grip of FIG. 5, or they may be woven to provide a constant weave from the body section 20' toward the draft end of the grip in the manner of the grip of FIG. 6.

It is the usual practice in closing split grips to start at the draft end with the fastening means and progressively close the grip towards the other end thereof as is shown in FIG. 7 of the drawings. As has been previously indicated, in performing this operation with conventional split grips having high weave angles, such an operation causes the grip to become distorted so that the last few mesh spaces or loops 38 at such other body end become so diminished in size that they are difficult to thread and the sides of the split mesh cannot be properly closed. However, by weaving the strand portions in the body section 21' in accordance with the invention, it has been found that sufficient additional circumferential stretch has been provided in the body at this section thereof, that even though the fastening operation may distort the grip weave, the side loops in such section 21' are relatively easy to secure together and the grip body can be properly closed throughout its length.

What is claimed is:

1. A wire grip composed of wire strands interwoven to form an open-mesh body adapted to be placed in surrounding gripping relation with an object and having a draft end to enable a gripped object to be supported or drawn endwise by the grip, said open-mesh body having a first longitudinal end section forming the other end of said body, a second intermediate longitudinal section having one end adjoining said first end section, and a third longitudinal section extending from the other end of said second intermediate section toward the draft end of such body, the wire strands in said body extending through said three longitudinal body sections and in at least said first end section and said second intermediate section being, in their unstressed braided condition, woven at different weave-angle patterns, the portions of the wire strands extending through said second intermediate section being woven at a given high-angle weave having a high degree of object gripping ability without slippage and the portions of the wire strands extending through said first end section having a weave-angle pattern substantially less than that of said second intermediate section to provide larger mesh size than in said second intermediate section and such that the weave in said first end section is capable of being expanded and contracted to vary the radial dimensions of such end section and forms a mesh size which enables the crossing portions of the strands at the juncture of said first end section and said second intermediate section to move freely relatively to each other, and the weave of the portions of the wire strands extending through said third longitudinal section forming a mesh size which enables the crossing portions of the strands at such other end of said second intermediate section to move freely relatively to each other.

2. A wire grip as defined in claim 1, in which the strand weave in said first end body section forms a mesh size which at the juncture thereof with said second intermediate section is at least as large as the mesh size in said second intermediate section and which gradually increases from the juncture of said second intermediate section therewith to said other body end in such manner as to cause such first end section to assume a funnellike shape capable of readily receiving objects through the tubular opening in such first end section when such end section is compressed for radial expansion.

3. A wire grip as defined in claim 1, in which the strand weave in said first end body section forms a mesh size which at the juncture thereof with said second intermediate section is at least as large as the mesh size in said second intermediate section and which is such throughout the remainder of the length thereof as to enable said first end section to be stretched circumferentially a materially greater extent than said second intermediate section.

4. A wire grip as defined in claim 1, in which said high-angle weave in said second intermediate section is such that the strands will assume a maximum working angle of from 130°-160° in the fully radially expanded condition of the grip.

5. A wire grip as defined in claim 1, in which said second intermediate section of high-angle weave extends for a predetermined axial length of the grip.

6. A wire grip as defined in claim 1, in which the weave of said strands in said third longitudinal section extending from said second intermediate section toward said draft end of said body forms a mesh size at least as great as the mesh size in said second intermediate section and progressively increasing toward said draft end of the grip.

7. A wire grip as defined in claim 1, in which the weave of said strands in said third longitudinal section extending from said second intermediate section toward said draft end thereof form a mesh size similar to the mesh size formed in said second intermediate section.

8. A wire grip as defined in claim 1, in which pairs of said grip body wire strands are connected together at said other end of the body to form a plurality of loops at the outer extremity of said first end section of the grip body, said loops forming an object receiving opening at such extremity of said end section and forming with crossing strand portions terminal circularly arranged mesh which are the largest in said first end section of the grip body and enable such end section to stretch to a greater extent than the second intermediate section of the grip body formed by said high-angle weave.

9. A wire grip as defined in claim 1, in which said grip body is a split sleeve in which the strands are woven to form a series of loops at each longitudinal edge thereof and includes means engaging said loops to fasten such longitudinal edges together, and in which the strand weave in said first end body section forms a mesh size and edge loops which are larger than the mesh size and loops in said second intermediate body section and are such as to enable such sleeve to be stretched circumferentially about an object a materially greater extent than said second intermediate section.

* * * * *